United States Patent
Yasaka et al.

(10) Patent No.: US 6,933,346 B2
(45) Date of Patent: Aug. 23, 2005

(54) SEALANT FOR POLYPROPYLENE AND EASILY OPENABLE HERMETICALLY SEALED PACKAGE INCLUDING THE SAME

(75) Inventors: Naoto Yasaka, Ichihara (JP); Masayoshi Yamaguchi, Ichihara (JP)

(73) Assignee: Mitsui Chemicals, Inc., Tokyo (JP)

(*) Notice: Subject to any disclaimer, the term of this patent is extended or adjusted under 35 U.S.C. 154(b) by 0 days.

(21) Appl. No.: 10/020,922

(22) Filed: Dec. 19, 2001

(65) Prior Publication Data

US 2002/0176952 A1 Nov. 28, 2002

(30) Foreign Application Priority Data

Dec. 18, 2000 (JP) ........................................ 2000-384275

(51) Int. Cl.[7] .................................................. C08F 8/00
(52) U.S. Cl. ......................... 525/191; 525/240; 428/35.7
(58) Field of Search ................................ 525/191, 240, 525/320, 324; 526/348, 348.2, 348.6, 352, 352.2; 428/34.1, 34.8, 35.2, 35.7, 35.8, 35.9

(56) References Cited

U.S. PATENT DOCUMENTS

| | | | | |
|---|---|---|---|---|
| 4,810,541 A | * | 3/1989 | Newman et al. ............ | 428/36.7 |
| 5,281,453 A | * | 1/1994 | Yamada et al. ............. | 428/35.7 |
| 5,525,689 A | * | 6/1996 | Tsutsui et al. ............... | 526/160 |
| 5,626,929 A | | 5/1997 | Stevenson .................. | 428/35.8 |
| 5,674,945 A | | 10/1997 | Takahashi et al. .......... | 525/240 |
| 5,741,861 A | * | 4/1998 | Yamamoto et al. ......... | 525/240 |
| 5,792,534 A | * | 8/1998 | deGroot et al. ........... | 428/36.92 |
| 5,882,789 A | * | 3/1999 | Jones et al. ................ | 428/349 |
| 5,942,579 A | * | 8/1999 | Falla et al. ................ | 525/240 |

FOREIGN PATENT DOCUMENTS

| | | |
|---|---|---|
| EP | 1 041 112 | 10/2000 |
| JP | 58 140248 | 8/1983 |
| JP | 7-17041 | 3/1995 |
| JP | 08 197694 | 8/1996 |
| WO | WO 01/53079 | 7/2001 |

* cited by examiner

*Primary Examiner*—Harold Pyon
*Assistant Examiner*—Walter B Aughenbaugh
(74) *Attorney, Agent, or Firm*—Birch, Stewart, Kolasch & Birch, LLP

(57) ABSTRACT

A sealant for polypropylene consisting essentially of a composition comprising a high-pressure-processed low-density polyethylene (A) having a density of 910 to 930 kg/m$^3$ and an MFR of 0.5 to 20 g/10 min; and an ethylene/α-olefin copolymer (B) having a density of 860 to less than 890 kg/m$^3$, an MFR of 0.5 to 40 g/10 min and an Mw/Mn of 1.5 to 3, and/or a linear low-density polyethylene (C) having a density of 890 to 940 kg/m$^3$ and an MFR of 0.2 to 30 g/10 min. In this composition, the component (A) is contained in an amount of 10 to 85% by weight, the component (B) in an amount of 50% by weight or less, and the component (B) and component (C) in a total amount of 15 to 90% by weight, based on the total weight of components (A), (B) and (C).

3 Claims, No Drawings

SEALANT FOR POLYPROPYLENE AND EASILY OPENABLE HERMETICALLY SEALED PACKAGE INCLUDING THE SAME

FIELD OF THE INVENTION

The present invention relates to a sealant for polypropylene and an easily openable hermetically sealed package including the same. More particularly, the present invention relates to a sealant for polypropylene, which, by virtue of heat sealing properties, is used as a sealant for a polypropylene film, a sheet, a cup or other molded items, and which, by virtue of melting properties, can be molded by extrusion laminating, casting or inflation, and further relates to an easily openable hermetically sealed package including the same.

BACKGROUND OF THE INVENTION

With respect to easily opened hermetically sealed packages, materials with which widely changing sealing strength can be attained by controlling the formulation of resin composition forming the package. Such materials are demanded because sealing strength will change, depending on the configuration of the package, the enclosed item and the heat sealed area.

When polypropylene is used as an adherend, the same kind of polypropylene is generally used as the heat sealing material. However, the exhibited sealing strength is so high that, although the sealability for enclosed item is excellent, opening the sealed area is difficult, causing the sealing material to be unsuitable for use in hermetically sealed packages which must ensure easy opening.

Japanese Patent Publication No. 7(1995)-17041 describes an easily openable unoriented hermetically sealed enclosure comprising a sealant of a composition composed of polypropylene and an ethylene/α-olefin random copolymer and an adherend of polypropylene. This publication is directed to an enclosure wherein a sealant having such a noncompatible phase structure that polypropylene is contained as a matrix phase while the ethylene/α-olefin random copolymer is contained as a dispersion phase is employed so that cohesive failure is caused at the time of peeling to easily open. In the noncompatible phase sealant capable of attaining the easy openness, although the sealing strength can be controlled by the configuration of dispersion phase, the dispersion phase is oriented at the time of film formation with the result that the sealing strength in the direction of flow (MD) at film formation is different from that in the direction perpendicular thereto (TD). Further, because polypropylene and the ethylene/α-olefin random copolymer have low melt tension, extrusion laminating of a mixture thereof brings about neck-in increase. Still further, inflation molding thereof possesses such a problem that disadvantages such as poor bubble stability would occur.

Therefore, there is a demand for the development of a sealant for polypropylene, which enables reducing the neck-in at extrusion laminating, which is excellent in the bubble stability at inflation molding, and which enables producing an easily opened hermetically sealed package exhibiting such a sealing strength as permits easily opening of a hermetically sealed package comprising polypropylene as an adherend, and further the development of such an easily openable hermetically sealed package.

OBJECT OF THE INVENTION

The present invention has been made with a view toward solving the above problems of the related art. It is an object of the present invention to provide a sealant for polypropylene, which enables reducing the neck-in at extrusion laminating, which is excellent in the bubble stability at inflation molding and which enables producing a hermetically sealed package that can be easily opened exhibiting such a sealing strength as permits easily opening of a hermetically sealed package comprising polypropylene as an adherend. It is another object of the present invention to provide such a hermetically sealed package.

SUMMARY OF THE INVENTION

The sealant for polypropylene of the present invention consists essentially of a composition comprising:

a high-pressure-processed low-density polyethylene (A) having a density (measured in accordance with ASTM D 1505) of 910 to 930 kg/m$^3$ and a melt flow rate (measured under a load of 2.16 kg at 190° C. in accordance with ASTM D 1238) of 0.5 to 20 g/10 min, and an ethylene/α-olefin copolymer (B) having a density (measured in accordance with ASTM D 1505) of 860 to less than 890 kg/m$^3$, a melt flow rate (measured under a load of 2.16 kg at 190° C. in accordance with ASTM D 1238), MFR$_{2.16}$, of 0.5 to 40 g/10 min and a molecular weight distribution (Mw/Mn) determined by gel permeation chromatography (GPC) of 1.5 to 3, obtained from ethylene and an α-olefin having 3 to 10 carbon atoms, and/or a linear low-density polyethylene (C) having a density (measured in accordance with ASTM D 1505) of 890 to 940 kg/m$^3$ and a melt flow rate (measured under a load of 2.16 kg at 190° C. in accordance with ASTM D 1238) of 0.2 to 30 g/10 min, obtained from ethylene and an α-olefin having 3 to 10 carbon atoms, wherein, in the composition, the high-pressure-processed low-density polyethylene (A) is contained in an amount of 10 to 85% by weight, the ethylene/α-olefin copolymer (B) is contained in an amount of 50% by weight or less, and the ethylene/α-olefin copolymer (B) and linear low-density polyethylene (C) are contained in a total amount of 15 to 90% by weight, based on the total weight of high-pressure-processed low-density polyethylene (A) ethylene/α-olefin copolymer (B) and linear low-density polyethylene (C), which composition exhibits a melt flow rate (measured under a load of 2.16 kg at 190° C. in accordance with ASTM D 1238) of 1 to 15 g/10 min and a melt tension (MT) measured at 190° C. of 5 to 100 mN.

With respect to the sealant for polypropylene, it is preferred that the ethylene/α-olefin copolymer (B) have a ratio, MFR$_{10}$/MFR$_{2.16}$, of melt flow rate (measured under a load of 10 kg at 190° C. in accordance with ASTM D 1238), MFR$_{10}$, to melt flow rate (measured under a load of 2.16 kg at 190° C. in accordance with ASTM D 1238), MFR$_{2.16}$, of 5 to 20.

With respect to the linear low-density polyethylene (C), the molecular weight distribution (Mw/Mn) determined by GPC is preferably in the range of 1.5 to 5.

The easily openable hermetically sealed package of the present invention comprises a laminate having a structure such that one side of a sealant layer (I) consisting essentially of the above sealant for polypropylene according to the present invention is overlaid with a resin layer of polypropylene (II) by heat sealing laminating.

In the easily openable hermetically sealed package of the present invention, the laminate preferably may have a structure such that another side, opposite to the side overlaid with the resin layer of polypropylene (II), of the sealant layer (I) is overlaid with a base layer (III) of a member selected from among a polyester, a polyamide, a metallized film, an aluminum foil and a polyolefin by laminating, wherein the sealant layer (I) has a thickness of 5 to 100 μm. In the easily openable hermetically sealed package, the base layer (III) may be laminated with the sealant layer (I) consisting essentially of the sealant for polypropylene according to the present invention by extrusion laminating.

In the easily openable hermetically sealed package of the present invention, the sealant layer (I) consisting essentially of the sealant for polypropylene according to the present invention may be formed by inflation molding or cast molding and may be overlaid with the base layer (III) by dry laminating.

An easily openable hermetically sealed package of the present invention can be, for example, one comprising a cover made of a sealant laminate and a cup made of a resin layer of polypropylene (II). The sealant laminate has a structure such that one side of a sealant layer (I) consisting essentially of the sealant for polypropylene according to the present invention is overlaid with a resin layer of polypropylene (II) by laminating; and such that another side, opposite to the side overlaid with the resin layer of polypropylene (II), of the sealant layer (I) is overlaid by laminating with a base layer (III), the base layer (III) is selected from the group consisting of a polyester, a polyamide, a metallized film, an aluminum foil and a polyolefin; the above base layer (III) and sealant layer (I) each having a thickness of 5 to 100 μm.

DETAILED DESCRIPTION OF THE INVENTION

The sealant for polypropylene and easily openable hermetically sealed package including the same according to the present invention will be described in detail below.

Sealant for Polypropylene

The sealant for polypropylene of the present invention consists essentially of a composition comprising a high-pressure-processed low-density polyethylene (A) and an ethylene/α-olefin copolymer (B) and/or a linear low-density polyethylene (C).

High-Pressure-Processed Low-Density Polyethylene (A)

The high-pressure-processed low-density polyethylene (A) for use in the present invention is a highly branched polyethylene resin having long-chain branches produced by radical polymerization of ethylene in the presence of a radical initiator under a high pressure by means of a conventional tubular reactor or autoclave reactor. According to necessity, a small amount of other polymerizable monomer may be copolymerized with ethylene.

The above polymerizable monomer can be, for example, an α-olefin, vinyl acetate or an acrylic ester.

Specific examples of the high-pressure-processed low-density polyethylenes (A) which can be used in the present invention include an ethylene homopolymer, an ethylene/vinyl acetate copolymer, an ethylene/acrylic acid copolymer and an ethylene/methacrylic acid copolymer.

The high-pressure-processed low-density polyethylene (A) for use in the present invention has a melt flow rate (measured under a load of 2.16 kg at 190° C. in accordance with ASTM D 1238) of 0.5 to 20 g/10 min, preferably 1 to 15 g/10 min and still preferably 2 to 15 g/10 min. When the melt flow rate is within these ranges, a composition being excellent in the moldability by means of conventional molding machines can be obtained.

Ethylene/α-olefin Copolymer (B)

The ethylene/α-olefin copolymer (B) for use in the present invention is a resin obtained by carrying out a random copolymerization of ethylene and an α-olefin having 3 to 10 carbon atoms.

The ethylene/α-olefin copolymer (B) has a melt flow rate (measured under a load of 2.16 kg at 190° C. in accordance with ASTM D 1238), $MFR_{2.16}$, of 0.5 to 40 g/10 min, preferably 1 to 30 g/10 min and still preferably 2 to 25 g/10 min. The ethylene/α-olefin copolymer (B) has a density (measured in accordance with ASTM D 1505) of 860 to less than 890 kg/m$^3$ preferably 870 to less than 890 kg/m$^3$ and still preferably 880 to less than 890 kg/m$^3$.

Further, the ethylene/α-olefin copolymer (B) has a molecular weight distribution (Mw/Mn) determined by GPC of 1.5 to 3, preferably 1.5 to 2.5. When the ethylene/α-olefin copolymer (B) whose molecular weight distribution (Mw/Mn) falls within the above ranges is employed, the molded film has low tack and high transparency. In the extrusion laminating thereof, the level of fuming is low, and a sealant of reduced odor and taste changes can be obtained.

The above molecular weight distribution (Mw/Mn) was measured with the use of GPC-150C manufactured by Millipore in the following manner.

TSK GNH HT was used as a separation column. The column size was 72 mm in diameter and 600 mm in length. The column temperature was 140° C. The mobile phase was composed of o-dichlorobenzene (produced by Wako Pure Chemical Industries, Ltd.) and 0.025% by weight of BHT (produced by Takeda Chemical Industries, Ltd.) as an antioxidant. The mobile phase was passed at a rate of 1.0 ml/min. The sample concentration was 0.1% by weight, and the injection amount of sample was 500 microliters. A differential refractometer was used as the detector. EPR was used as the standard sample.

With respect to the ethylene/α-olefin copolymer (B) for use in the present invention, it is preferred that the ratio ($MFR_{10}/MFR_{2.16}$) of melt flow rate (measured under a load of 10 kg at 190° C. in accordance with ASTM D 1238), $MFR_{10}$, to the above $MFR_{2.16}$ be in the range of 5 to 20.

The α-olefin having 3 to 10 carbon atoms for use in the copolymerization with ethylene can be, for example, any of propylene, 1-butene, 1-pentene, 1-hexene, 1-heptene, 1-octene, 1-nonene, 1-decene and 4-methyl-1-pentene. Of these, propylene, 1-butene, 1-hexene, 4-methyl-1-pentene and 1-octene are preferred. These α-olefins are used individually or in combination.

In the ethylene/α-olefin copolymer (B), the content of constituent units derived from ethylene (ethylene content) is generally in the range of 80 to 90 mol %, preferably 85 to 95 mol %.

The particular composition of ethylene/α-olefin copolymer (B) is generally determined by homogeneously dissolving about 200 mg of ethylene/α-olefin copolymer in 1 ml of hexachlorobutadiene in a sample tube of 10 mm diameter and obtaining a $^{13}$C-NMR spectrum of the resultant sample under such conditions that the measuring temperature is 120° C., the measuring frequency 25.05 MHz, the spectral width 1500 Hz, the pulse repetition time 4.2 sec, and the pulse width 6 μsec.

The ethylene/α-olefin copolymer (B) may contain units derived from other polymerizable monomers other than the above units in an amount not detrimental to the object of the present invention.

Specifically, the ethylene/α-olefin copolymer (B) can be, for example, any of an ethylene/propylene random copolymer, an ethylene/1-butene random copolymer, an ethylene/propylene/1-butene random copolymer, an ethylene/1-hexene random copolymer, an ethylene/4-methyl-1-pentene random copolymer, an ethylene/1-octene random copolymer and an ethylene/1-decene random copolymer. Of these, an ethylene/propylene random copolymer, an ethylene/1-butene random copolymer, an ethylene/1-hexene random copolymer, an ethylene/4-methyl-1-pentene random copolymer and an ethylene/1-octene random copolymer are preferably used. These copolymers may be used in combination.

Linear Low-Density Polyethylene (C)

The linear low-density polyethylene (C) for use in the present invention is an ethylene/α-olefin copolymer (resin) obtained by copolymerizing ethylene and an α-olefin having 3 to 20 carbon atoms in the presence of known Ziegler-Natta catalyst or metallocene catalyst.

The α-olefin having 3 to 20 carbon atoms can be, for example, any of propylene, 1-butene, 1-pentene, 2-methyl-1-butene, 3-methyl-1-butene, 1-hexene, 3-methyl-1-pentene, 4-methyl-1-pentene, 3,3-dimethyl-1-butene, 1-heptene, methyl-1-hexene, dimethyl-1-pentene, trimethyl-1-butene, ethyl-1-pentene, 1-octene, methyl-1-pentene, dimethyl-1-hexene, trimethyl-1-pentene, ethyl-1-hexene, methylethyl-1-pentene, diethyl-1-butene, propyl-1-pentene, 1-decene, methyl-1-nonene, dimethyl-1-octene, trimethyl-1-heptene, ethyl-1-octene, methylethyl-1-heptene, diethyl-1-hexene, 1-dodecene and 1-hexadocene. Of these, α-olefins having 3 to 10 carbon atoms such as propylene, 1-butene, 1-pentene, 1-hexene, 4-methyl-1-pentene and 1-octene are preferred.

These α-olefins are used individually or in combination.

As the linear low-density polyethylene (C) preferably employed in the present invention, there can be mentioned, for example, an ethylene/propylene copolymer, an ethylene/1-butene copolymer, an ethylene/1-pentene copolymer, an ethylene/1-hexene copolymer, an ethylene/4-methyl-1-pentene copolymer or an ethylene/1-octene copolymer.

In the linear low-density polyethylene (C), the content of constituent units derived from ethylene (ethylene content) is generally in the range of 1 to 10 mol %, preferably 2 to 8 mol % and still preferably 3 to 8 mol %.

The particular composition of ethylene/α-olefin copolymer is generally determined by homogeneously dissolving about 200 mg of ethylene/α-olefin copolymer in 1 ml of hexachlorobutadiene in a sample tube of 10 mm diameter and obtaining a $^{13}$C-NMR spectrum of the resultant sample under such conditions that the measuring temperature is 120° C., the measuring frequency 25.05 MHz, the spectral width 1500 Hz, the pulse repetition time 4.2 sec, and the pulse width 6 μsec.

The linear low-density polyethylene (C) has a melt flow rate (measured under a load of 2.16 kg at 190° C. in accordance with ASTM D 1238) of 0.2 to 30 g/10 min, preferably 0.5 to 20 g/10 min and still preferably 2 to 20 g/10 min. When the melt flow rate is within these ranges, a composition being excellent in the moldability by means of conventional molding machines can be obtained.

The linear low-density polyethylene (C) has a density (measured in accordance with ASTMD 1505) of 890 to 940 kg/m$^3$, preferably 900 to 940 kg/m$^3$ and still preferably 900 to 930 kg/m$^3$. When the density falls within these ranges, there can be obtained a composition which can be molded into a film of appropriate tack which can avoid lowering of the charging speed at the time of charging of an item to be enclosed and has such an appropriate melting point that excellent low-temperature heat sealing properties can be realized. This composition is suitable for constituting the sealant for polypropylene.

Sealant for Polypropylene

The sealant for polypropylene of the present invention, as aforementioned, consists essentially of the composition comprising the high-pressure-processed low-density polyethylene (A), namely, the high-pressure-processed low-density polyethylene (A) is essentially included in the composition, and, in addition to this, the ethylene/α-olefin copolymer (B) and/or the linear low-density polyethylene (C) is(are) included in the composition.

In this composition, the high-pressure-processed low-density polyethylene (A) is contained in an amount of 10 to 85% by weight, preferably 15 to 80% by weight and still preferably 15 to 60% by weight; the ethylene/α-olefin copolymer (B) is contained in an amount of 50% by weight or less, preferably 10 to 50% by weight and still preferably 20 to 50% by weight; and the ethylene/α-olefin copolymer (B) and linear low-density polyethylene (C) are contained in a total amount of 15 to 90% by weight, preferably 20 to 85% by weight and still preferably 40 to 85% by weight, based on the total weight of high-pressure-processed low-density polyethylene (A), ethylene/α-olefin copolymer (B) and linear low-density polyethylene (C). Provided, however, that one of the ethylene/α-olefin copolymer (B) and the linear low-density polyethylene (C) maybe 0% by weight based on the total weight.

In the present invention, it is preferred that the sealant composition substantially do not contain polypropylene (homopolymer, block copolymer, etc.). It is still preferred that the sealant composition substantially consist of the high-pressure-processed low-density polyethylene (A), and ethylene/α-olefin copolymer (B) and/or linear low-density polyethylene (C) only, more preferred that the sealant composition substantially consist of the high-pressure-processed low-density polyethylene (A), ethylene/α-olefin copolymer (B) and linear low-density polyethylene (C) only.

Further, this composition exhibits a melt flow rate (MFR, measured under a load of 2.16 kg at 190° C. in accordance with ASTM D 1238) of 1 to 15 g/10 min, preferably 2 to 15 g/10 min and still preferably 4 to 13 g/10 min. The melt tension (MT) measured at 190° C. thereof is in the range of 5 to 100 mN, preferably 10 to 90 mN and still preferably 15 to 60 mN.

The melt tension (MT) of the above composition is measured as a stress exhibited when a molten sample is drawn at a constant rate. In the present invention, in particular, the melt tension (MT) is measured as a stress exhibited when a molten sample is drawn by means of MT measuring instrument (manufactured by Toyo Seiki Seisakusho Co., Ltd.) under such conditions that the resin temperature is 190° C., the extrusion rate 15 mm/min, the take-up speed 15 m/min, the nozzle diameter 2.10 mm and the nozzle length 8 mm.

The composition comprising the high-pressure-processed low-density polyethylene (A), ethylene/α-olefin copolymer (B) and linear low-density polyethylene (C) in the amounts falling within the above ranges and whose melt flow rate (MFR) and melt tension (MT) fall within the above ranges enables reducing the neck-in at extrusion laminating and is excellent in the bubble stability at inflation molding. Moreover, this composition enables producing an easily openable hermetically sealed package exhibiting such a sealing strength as permits easily opening of a hermetically sealed package comprising polypropylene as an adherend. Therefore, this composition is suitable for constituting the sealant for polypropylene.

In the present invention, according to necessity, the above composition can be loaded with common additives such as a heat stabilizer, a weathering stabilizer, a slip agent and an antiblocking agent in amounts not detrimental to the object of the present invention, depending on the molding method, usage form, etc.

Preparation of Sealant for Polypropylene

The sealant for polypropylene (namely, the above composition) of the present invention is prepared by melt blending the high-pressure-processed low-density polyethylene (A) and ethylene/α-olefin copolymer (B) and/or linear low-density polyethylene (C) optionally together with the above additives with the use of various conventional techniques.

Specifically, the sealant for polypropylene of the present invention can be obtained by either simultaneously or sequentially dry blending the above components by means of, for example, a Henschel mixer, or obtained by first mixing the above components by means of, for example, a Henschel mixer, a V blender, a tumbler mixer or a ribbon blender and thereafter melt kneading the mixture by means of a kneading apparatus such as a single-screw extruder, a multiple-screw extruder, a kneader or a Banbury mixer.

When a kneading apparatus having excellent kneading capability, such as an extruder, a kneader or a Banbury mixer, is used, a sealant wherein the components are highly homogeneously dispersed can be obtained.

At any stage of this preparation process, according to necessity, the above additives, for example, a heat stabilizer can be added to the mixture.

Easily Openable Hermetically Sealed Package

The easily openable hermetically sealed package of the present invention comprises a laminate having a structure such that one side of a sealant layer (I) consisting essentially of the above sealant for polypropylene according to the present invention is overlaid with a resin layer of polypropylene (II) by heat sealing laminating.

This easily openable hermetically sealed package may consist of a laminate having a structure such that a base layer (III) of a member selected from among a polyester, a polyamide, a metallized film, an aluminum foil and a polyolefin is laminated with the sealant layer (I), the sealant layer (I) having a thickness of 5 to 100 μm, preferably 10 to 50 μm. The method wherein the sealant is overlaid with polypropylene adherend (resin layer (II)) by heat sealing laminating is employed.

For example, the easily openable hermetically sealed package can be produced by:

the method (a) wherein the base layer (III) is coated with an anchor coat agent, the layer of high-pressure-processed low-density polyethylene (IV) is provided thereon by extrusion laminating, and the layer of high-pressure-processed low-density polyethylene (IV) is overlaid with the sealant layer (I) by extrusion laminating;

the method (b) wherein the base layer (III) is overlaid with a layer (V) of an adherent resin obtained by acid modifying a polyolefin by extrusion laminating, and the adherent resin layer (V) is overlaid with the sealant layer (I) by extrusion laminating;

the method (c) where in the base layer (III) is overlaid with a layer (V) of an adherent resin obtained by acid modifying a polyolefin and with the sealant layer (I) by co-extrusion laminating;

the method (d) wherein molded sealant layer (I) obtained by inflation or cast molding is bonded to the base layer (III) by dry laminating; or the method (e) wherein the base layer (III), the adherent resin layer (V) or a bonding layer of ethylene/α-olefin copolymer and the sealant layer are formed by co-extrusion by means of an inflation molding machine or a cast molding machine.

The easily openable hermetically sealed package of the present invention can be in the form of a film or sheet molding obtained by, for example, cast molding or sheet molding, or in the form of a cup molding obtained by, for example, injection molding or vacuum forming.

With respect to the easily openable hermetically sealed package as employed, the adherend to be laminated with the sealant layer is not limited as long as it is constituted of polypropylene, and use can be made of, for example, a multilayer film, sheet or cup having a barrier layer as an internal layer.

When a film or sheet molding is used, a three-way sealing of the sealant laminate and the polypropylene film or sheet is effected by heat sealing to thereby obtain a package, an item to be enclosed is charged thereinto, and an upper part of the package is heat sealed.

When a cup molding is used, an item to be enclosed is charged into a polypropylene cup, and heat sealing laminating is effected with the use of the sealant laminate as a cover.

In this case, for example, an easily openable hermetically sealed package comprising a cover of a laminate and a cup of a resin layer of polypropylene (II), said laminate having a structure such that one side of a sealant layer (I) consisting essentially of the sealant for polypropylene of the invention is overlaid with a resin layer of polypropylene (II) by laminating and such that another side, opposite to the side overlaid with the resin layer of polypropylene (II), of the sealant layer (I) is overlaid with a base layer (III) of a member selected from among a polyester, a polyamide, a metallized film, an aluminum foil and a polyolefin by laminating, said base layer (III) and said sealant layer (I) each having a thickness of 5 to 100 μm, preferably 10 to 50 μm.

EFFECT OF THE INVENTION

By virtue of the present invention, there can be provided the sealant for polypropylene, which enables reducing the neck-in at extrusion laminating, which is excellent in the bubble stability at inflation molding and which enables producing an easily openable hermetically sealed package exhibiting such a sealing strength as permits easily opening of a hermetically sealed package comprising polypropylene as an adherend. Further, there can be provided the easily openable hermetically sealed package of such characteristics.

EXAMPLE

The present invention will further be illustrated below with reference to the following Examples which in no way limit the scope of the invention.

Example 1

A triple layer film consisting of a base layer of homopolypropylene (homoPP), a bonding layer of ethylene/propylene copolymer (EP) and a sealant layer whose thicknesses were 50 μm, 20 μm and 20 μm, respectively, was formed by co-extrusion by means of a cast molding machine of 350 mm die width. The forming of the triple layer film was performed at a speed of 10 m/min.

The melt flow rate (measured under a load of 2.16 kg at 230° C. in accordance with ASTM D 1238) of the above homopolypropylene (homoPP) was 7.0 g/10 min. The melt flow rate (measured under a load of 2.16 kg at 230° C. in accordance with ASTM D 1238) of the ethylene/propylene copolymer (EP) was 1.8 g/10 min.

As the sealant for constituting the above sealant layer, there was employed a composition consisting of:

50 parts by weight of an ethylene/1-butene copolymer (hereinafter referred to as "EB(1)") exhibiting a melt flow rate (measured under a load of 2.16 kg at 190° C. in accordance with ASTMD 1238), $MFR_{2.16}$, of 20 g/10 min, a density (measured in accordance with ASTM D 1505) of 885 kg/m³, a molecular weight distribution (Mw/Mn) measured with the use of GPC of 1.9 and a ratio, $MFR_{10}/MFR_{2.16}$, of melt flow rate (measured under a load of 10 kg at 190° C. in accordance with ASTM D 1238), $MFR_{10}$, to melt flow rate (measured under a load of 2.16 kg at 190° C. in accordance with ASTM D 1238), $MFR_{2.16}$, of 6.3, and 50 parts by weight of a high-pressure-processed low-density polyethylene (hereinafter referred to as "HPLDPE (1)") exhibiting a melt flow rate (measured under a load of 2.16 kg at 190° C. in accordance with ASTM D 1238) of 7 g/10 min, a density (measured in accordance with ASTM D 1505) of 918 kg/m³ and a melt tension (MT) measured at 190° C. of 65 mN.

Thereafter, the surface of the sealant layer of the obtained triple layer film was overlaid with a 200 μm thick homopolypropylene sheet (adherend), and heat sealing was effected in the following manner. The heat sealing strength was measured as follows.

Heat Sealing Strength:

The surface of the sealant layer of the obtained triple layer film was overlaid with the homopolypropylene sheet. The laminate was subjected to heat sealing performed at each of 160° C., 170° C., 180° C., 190° C. and 200° C. under a pressure of 0.2 MPa for 1 sec with the use of a sealing bar of 5 mm width, and allowed to cool. Specimens of 15 mm width were cut out therefrom, and peeling of heat sealed portion was conducted at a cross head speed of 300 mm/min. The peeling strength is referred to as the heat sealing strength (mN/15 mm).

The results are listed in Table 1.

Comparative Example 1

The same procedure as in Example 1 was repeated except that a composition consisting of 40 parts by weight of the above ethylene/1-butene copolymer (EB(1)), 40 parts by weight of the above high-pressure-processed low-density polyethylene (HPLDPE(1)) and 20 parts by weight of the above homopolypropylene (homoPP) was used in place of the composition employed for constituting the sealant layer of the triple layer film in Example 1. The results are listed in Table 1.

TABLE 1

|  | Example 1 | Comp. Ex. 1 |
|---|---|---|
| Composition for forming sealant layer | | |
| Composition [parts by weight] | | |
| EB (1) | 50 | 40 |
| HPLDPE (1) | 50 | 40 |
| homoPP | — | 20 |
| Properties | | |
| MFR (190° C.) [g/10 min] | 9.5 | 8.2 |
| melt tension [mN] | 27 | 22 |
| Heat sealing strength [mN/15 mm] | | |

TABLE 1-continued

|  | Example 1 | Comp. Ex. 1 |
|---|---|---|
| sealing temperature | | |
| 160° C. | 7.7 | 5.8 |
| 170° C. | 11.1 | 6.4 |
| 180° C. | 13.2 | 7.0 |
| 190° C. | 12.8 | 6.9 |
| 200° C. | 13.0 | 6.3 |

As apparent from Table 1, satisfactory sealing strength was not attained in Comparative Example 1 wherein the composition consisting of the ethylene/1-butene copolymer (EB (1)), high-pressure-processed low-density polyethylene (HPLDPE(1)) and homopolypropylene (homoPP) was used as the sealant.

Examples 2 to 4 and Comparative Examples 2 and 3

A base layer of polyethylene terephthalate (PET) was coated with an anchor coat agent by extrusion laminating, and overlaid with a layer of high-pressure-processed low-density polyethylene (LDPE) at a set temperature of 310° C. by extrusion laminating.

Thereafter, the resultant layer of LDPE was overlaid with a sealant layer at a set temperature of 305° C. by extrusion laminating.

With respect to the layers of the thus obtained laminate, the thicknesses of the PET layer, LDPE layer and sealant layer were 12 μm, 25 μm and 30 μm, respectively.

The above extrusion laminating was carried out by the use of an extrusion laminating machine of 65 mm screw diameter and 500 mm die width under such conditions that the air gap was 130 mm and the take-up speed was 80 m/min.

As the sealant for constituting the sealant layer of the above triple layer film, there were employed compositions obtained by blending the following resins in proportions specified in Table 2.

Resin Employed for Constituting the Sealant Layer (1) Ethylene/1-butene copolymer (EB(1))
  same as the ethylene/1-butene copolymer (EB(1)) used in Example 1.
(2) High-pressure-processed low-density polyethylene (HPLDPE(1))
  same as the high-pressure-processed low-density polyethylene (HPLDPE(1)) used in Example 1.
(3) Linear low-density polyethylene (LLDPE(1))
  MFR (measured under a load of 2.16 kg at 190° C. in accordance with ASTM D 1238): 4.0 g/10 min,
  density (measured in accordance with ASTM D 1505): 905 kg/m$^3$,
  comonomer: 1-hexene,
  ethylene content: 94 mol %, and
  catalyst used in the polymerization: metallocene olefin polymerization catalyst.
(4) Linear low-density polyethylene (LLDPE(2))
  MFR (measured under a load of 2.16 kg at 190° C. in accordance with ASTM D 1238): 4.0 g/10 min,
  density (measured in accordance with ASTM D 1505): 920 kg/m$^3$,
  comonomer: 1-butene,
  ethylene content: 89 mol %, and
  catalyst used in the polymerization: Ziegler olefin polymerization catalyst.

The evaluation of moldability was made on the basis of neck-in, i.e., the difference between extruder die width and film width with respect to extrusion performed under such conditions that the film thickness was 20 μm and the take-up speed was 80 m/min, and on the basis of drawdown property, i.e., the speed at which film breakage occurred when the take-up speed was increased under the same extrusion conditions (film thickness: 20 μm) as in the measurement of neck-in.

Thereafter, the surface of the sealant layer of the thus obtained triple layer film was overlaid with a 200 μm thick homopolypropylene sheet (adherend), and heat sealing was effected in the following manner. The heat sealing strength was measured as follows.

Heat Sealing Strength:

The surface of the sealant layer of the obtained triple layer film was overlaid with the homopolypropylene sheet. The laminate was subjected to heat sealing performed at each of 160° C., 170° C., 180° C., 190° C. and 200° C. under a pressure of 0.3 MPa for 4 sec with the use of a sealing bar of 5 mm width, and allowed to cool. Specimens of 15 mm width were cut out therefrom, and peeling of heat sealed portion was conducted at a cross head speed of 300 mm/min. The peeling strength is referred to as the heat sealing strength (mN/15 mm).

The results are listed in Table 2.

TABLE 2

|  | Example 2 | Example 3 | Example 4 | Comp. Ex. 2 | Comp Ex. 3 |
|---|---|---|---|---|---|
| Composition for forming sealant layer | | | | | |
| Composition [parts by weight] | | | | | |
| EB (1) | 40 | 30 | 40 | 60 | 50 |
| HPLDPE (1) | 20 | 20 | 20 | 40 | — |
| LLDPE (1) | 40 | 50 | — | — | 50 |
| LLDPE (2) | — | — | 40 | — | — |
| Properties | | | | | |
| MFR (190° C.) [g/10 min] | 6.3 | 6.4 | 5.0 | 11 | 7.1 |
| melt tension [mN] | 23 | 21 | 29 | 21 | 3.9 |

TABLE 2-continued

|  | Example 2 | Example 3 | Example 4 | Comp. Ex. 2 | Comp Ex. 3 |
|---|---|---|---|---|---|
| Moldability | | | | | |
| neck-in [mm] | 68 | 80 | 73 | 51 | 120 |
| drawdown [m/min] | 290 | 300 | 280 | 300 | 300 |
| Heat sealing strength [mN/15 mm] | | | | | |
| sealing temperature | | | | | |
| 160° C. | 22.7 | 22.1 | 24.7 | 16.9 | — |
| 170° C. | 25.5 | 22.2 | 26.2 | 17.8 | — |
| 180° C. | 24.5 | 23.4 | 27.8 | 20.2 | — |
| 190° C. | 38.0 | 37.9 | 38.6 | 26.8 | — |
| 200° C. | 42.7 | 40.5 | 36.8 | 18.8 | — |

In Comparative Example 2, a reduction of the heat sealing strength at 200° C. was recognized. In Comparative Example 3, the neck-in was so large that practical disadvantage occurred.

What is claimed is:

1. A sealant for an easily openable package for polypropylene consisting essentially of a composition comprising:

a high-pressure-processed low-density polyethylene (A) having a density (measured in accordance with ASTM D 1505) of 910 to 930 kg/m$^3$ and a melt flow rate (measured under a load of 2.16 kg at 190° C. in accordance with ASTM D 1238) of 0.5 to 20 g/10 min, an ethylene/α-olefin copolymer (B) having a density (measured in accordance with ASTM D 1505) of 860 to less than 890 kg/m$^3$, a melt flow rate (measured under a load of 2.16 kg at 190° C. in accordance with ASTM D 1238), MFR$_{2.16}$, of 0.5 to 40 g/10 min and a molecular weight distribution (Mw/Mn) determined by gel permeation chromatography (GPC) of 1.5 to 3, obtained from ethylene and an α-olefin having 3 to 10 carbon atoms, and a linear low-density polyethylene (C) having a density (measured in accordance with ASTM D 1505) of 890 to 940 kg/m$^3$ and a melt flow rate (measured under a load of 2.16 kg at 190° C. in accordance with ASTM D 1238) of 0.2 to 30 g/10 min, obtained from ethylene and an α-olefin having 3 to 10 carbon atoms;

wherein, in the composition, the high-pressure-processed low-density polyethylene (A) is contained in an amount of 10 to 85% by weight, the ethylene/α-olefin copolymer (B) is contained in an amount of 10% by weight or more to less than 50% by weight, and the ethylene/α-olefin copolymer (B) and said linear low-density polyethylene (C) are contained in a total amount of 15 to 90% by weight, based on the total weight of high-pressure-processed low-density polyethylene (A), ethylene/α-olefin copolymer (B) and linear low-density polyethylene (C), which composition exhibits a melt flow rate (measured under a load of 2.16 kg at 190° C. in accordance with ASTM D 1238) of 1 to 15 g/10 min and a melt tension (MT) measured at 190° C. of 5 to 100 mN.

2. The sealant for polypropylene as claimed in claim 1, wherein said sealant comprises said ethylene/α-olefin copolymer (B) having a ratio, MFR$_{10}$/MFR$_{2.16}$, of melt flow rate (measured under a load of 10 kg at 190° C. in accordance with ASTM D 1238), MFR$_{10}$, to melt flow rate (measured under a load of 2.16 kg at 190° C. in accordance with ASTM D 1238), MFR$_{2.16}$, of 5 to 20.

3. The sealant for polypropylene as claimed in claim 1, wherein the molecular weight distribution (Mw/Mn) determined by GPC of the linear low-density polyethylene (C), is in the range of 1.5 to 5.

* * * * *